United States Patent [19]

Gilbertson

[11] 4,250,358
[45] Feb. 10, 1981

[54] CONTROL UNIT FOR MARINE ENGINES EMPLOYING SAFETY STOP SWITCH

[75] Inventor: Gary G. Gilbertson, Brownsville, Wis.

[73] Assignee: Brunswick Corporation, Skokie, Ill.

[21] Appl. No.: 19,173

[22] Filed: Mar. 9, 1979

[51] Int. Cl.³ .............................................. H01H 3/14
[52] U.S. Cl. ........................... 200/52 R; 200/61.58 R; 200/153 F; 200/161
[58] Field of Search ............ 200/52 R, 52 A, 61.58 R, 200/161, 153 F, 61.19, 333, 329, 320, 42 R, 334

[56] References Cited

U.S. PATENT DOCUMENTS

| | | | |
|---|---|---|---|
| 2,722,575 | 11/1955 | Dobkins | 200/61.58 X |
| 2,798,914 | 7/1957 | Lawson et al. | 200/67 R |
| 3,786,892 | 1/1974 | Horton | 115/76 |

*Primary Examiner*—Stanley J. Witkowski
*Assistant Examiner*—Morris Ginsburg

*Attorney, Agent, or Firm*—O. T. Sessions

[57] ABSTRACT

A safety stop switch for a marine engine includes a control unit housing, and a normally closed, single throw toggle switch mounted on the housing and including a switch arm extending away from the housing to permit operation of the switch between closed and open positions. The switch is electrically connected to the engine to interrupt engine operation when switched to the open position. A hood extends from the periphery of the housing and covers the switch arm when in the closed position, and has a peripheral lip which is spaced from the switch arm a dimension which is less than the thickness of a key which encircles the switch arm. A lanyard is connected to the key and to the boat operator, and upon the exertion of a force on the lanyard, the key pulls the switch arm down into the open position, thereby interrupting operation of the marine engine.

7 Claims, 9 Drawing Figures

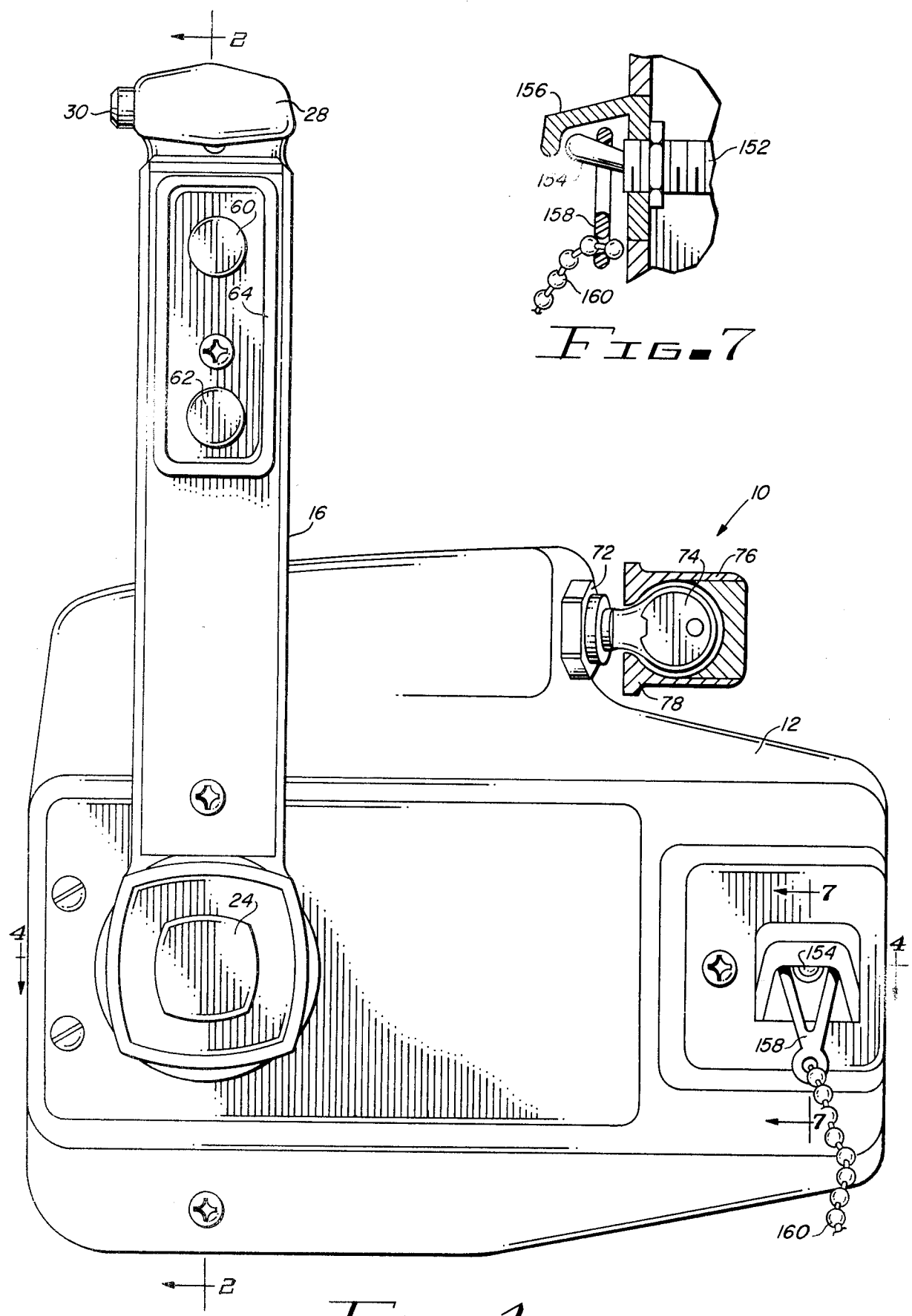

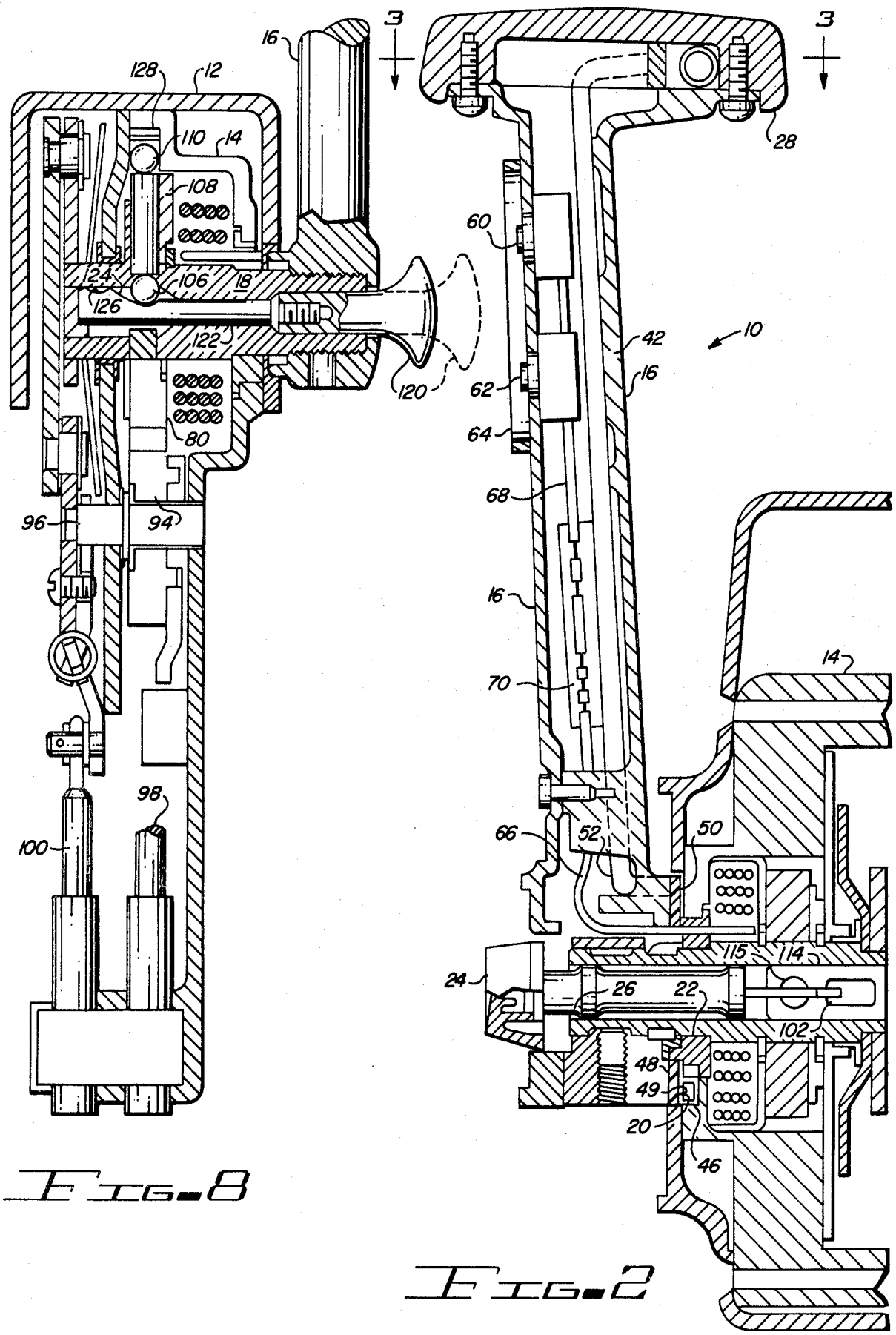

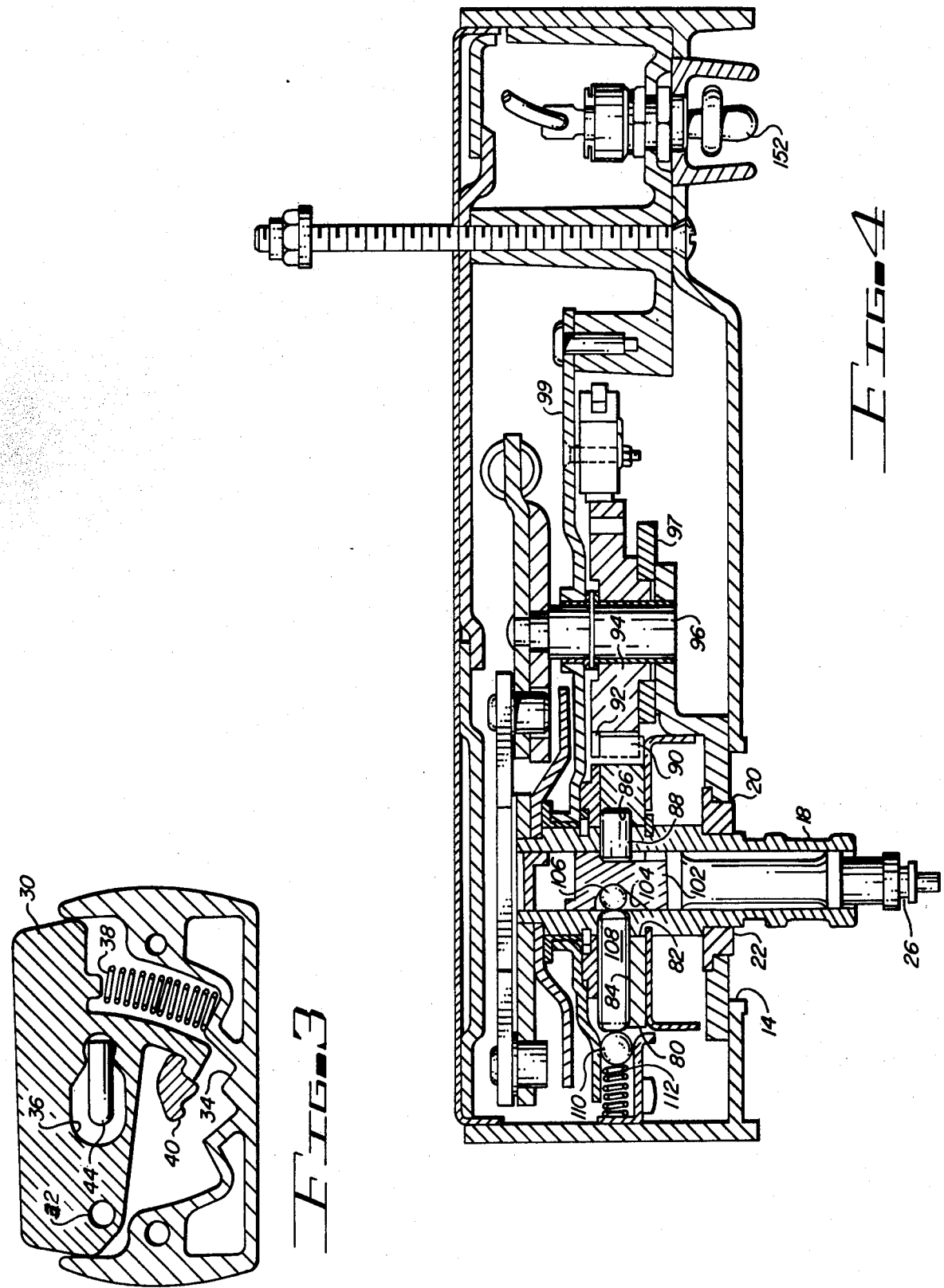

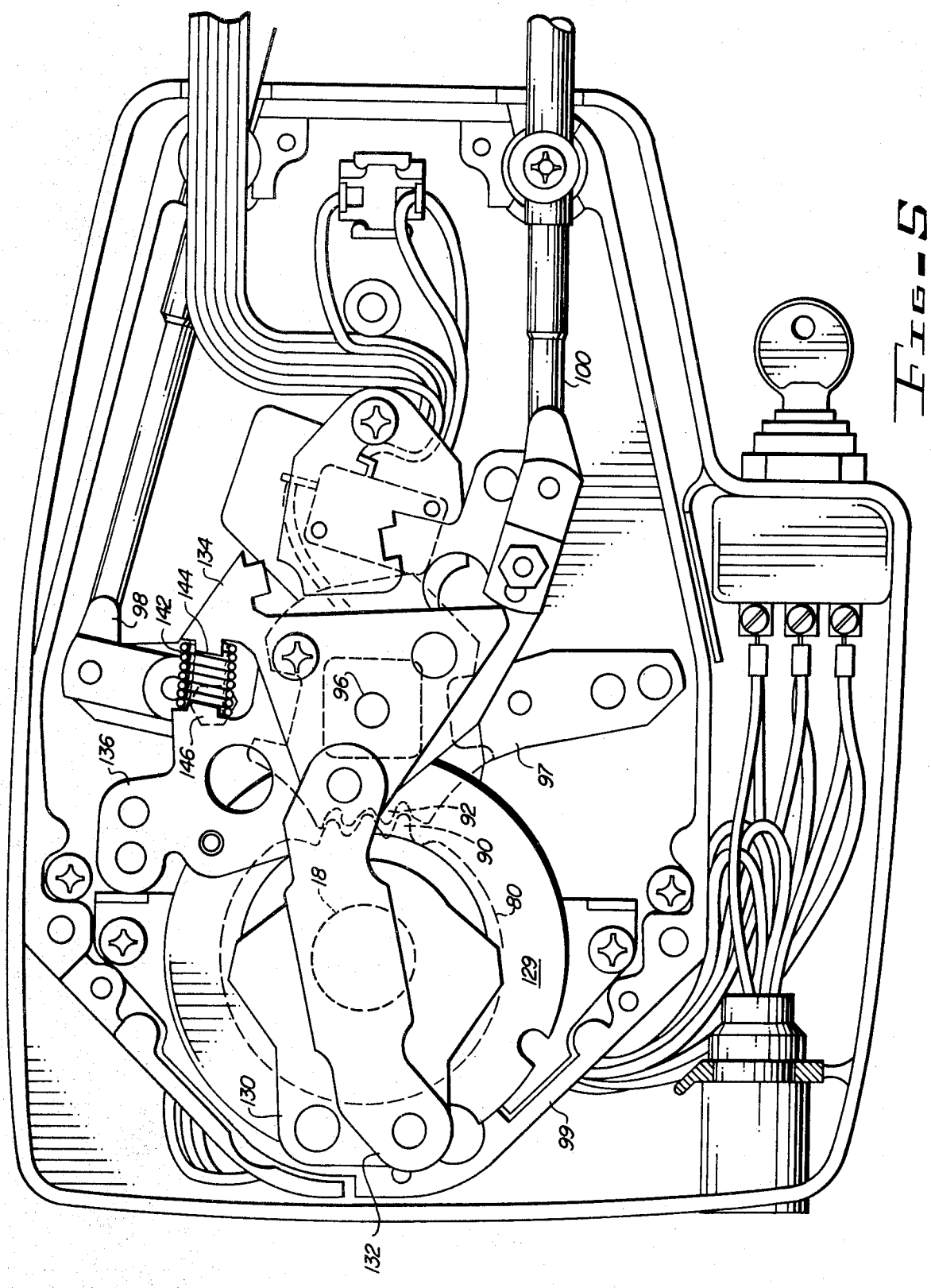

CONTROL UNIT FOR MARINE ENGINES EMPLOYING SAFETY STOP SWITCH

BACKGROUND OF THE INVENTION

1. Field of the Invention

The present invention relates to engine control devices, and particularly relates to mechanisms designed to remotely control the throttle, shift and emergency stop functions of marine engines.

2. Description of the Prior Art

A number of remote control units for marine engines have been developed in the prior art. The most widely used of these control units include a remote housing and a single control handle. The control handle is connected to the throttle and shift mechanisms of the engine by throttle and shift cables. The control unit also may include electrical switches which are connected to the electrical system of the engine. These remote control units permit operation of only the shift mechanism (forward or reverse) during the first portion of rotation of the control handle and then, during the last portion of rotation, permit control of only the throttle mechanism. Such arrangements are disclosed in the following U.S. Pat. Nos.: 3,301,084 to Boda; 3,309,938 to Pervier; and 4,027,555 to Rauchle, et al.

The United States patents to Pervier and Rauchle, et al, also describe a "warm up" or "throttle only" button positioned at the base of the control handle. This button disengages the shift mechanism and permits operation of only the throttle mechanism upon rotation of the handle. One disadvantage of such "throttle only" mechanisms is that they utilize a driving key which moves axially to engage or disengage a shift mechanism. This requires an elongated slot which is difficult and costly to manufacture.

One known prior control also includes a neutral lock mechanism. The neutral lock mechanism locks the control handle in a neutral position. Included in the neutral lock mechanism is a release lever or trigger to unlock the control handle. When unlocked, the control handle can be rotated to operate the shift and throttle mechanisms. The problem with this known prior control is that the trigger is on the lower surface of a T-shaped control handle. This position of the trigger is difficult to operate with a natural closing of the hand over the T-shaped control handle. This prior known control also was limited to a vertical handle position for neutral.

Marine engines have also used a safety stop switch as a separate accessory. A safety stop switch is used to stop the engine in an emergency. One suitable prior safety stop switch used a spring loaded push switch which when depressed permits the engine to operate. A cap is normally positioned on the switch to permit the engine to operate. The cap is connected to the operator so that if the operator is thrown from the control station the lanyard pulls the cap free of the switch causing the engine to stop. The safety stop switch must be continually depressed to allow a passenger to restart and run the engine in order to rescue the operator.

U.S. Pat. Nos. 2,588,650; 2,729,984; 2,826,283; 2,919,772; 2,975,653; 3,023,869; 3,165,941; 3,208,300; 2,702,615; 2,737,822; 2,884,109; 2,960,199; 2,986,044; 3,043,159; 3,202,125; 3,143,994; 2,705,485; 2,762,606; 2,907,421; 2,966,969; 2,987,152; 3,127,785; 3,204,732; and 3,160,027 describe prior remote control units for marine engines. These patents describe one method for absorbing unwanted throttle movement during shifting. This is accomplished by a spring attached to a control cable anchor point. When the control handle is moved for shifting, the spring maintains the idle throttle position until the shift motion is completed. Although satisfactory, it is not suitable for a compact design.

SUMMARY OF THE INVENTION

The present invention contemplates a safety stop switch for an engine, and more particularly a marine engine, for use with a remote control unit for the marine engine. Included is a control unit housing, and a normally closed toggle switch mounted on the housing and having a switch arm extending away from the housing to permit operation of the switch between closed and open positions. The switch is electrically connected to the engine to interrupt engine operation when switched to the open position. A key is included which encircles the switch arm, and means are provided for restricting removal of the key from the switch arm while the switch is in the closed position. Additional means, such as a lanyard, are coupled to the key to exert a force through the key against the switch arm to thereby operate the switch to the open position.

In a preferred embodiment, the restricting means preventing removal of the key while the switch arm is in the closed position comprises a hood having a lip at the extremity thereof which is spaced from the switch arm while in the closed position a dimension less than the thickness of the key. Preferably, the switch arm is mounted so as to move in a vertical plane, the hood further including a pair of slanted wing walls which extend away from the periphery of the control unit housing to the peripheral lip. The hood, including the lip and the wing wall portions thus form a partial enclosure about the switch, to maintain the key on the switch arm, until a sufficient force exerted along the length of the lanyard causes the key to pull the switch arm downward to interrupt operation of the engine.

The safety stop switch of the present invention permits the interruption of the engine operation during emergency conditions. Typical emergency conditions of this type may occur when the operator of the boat falls overboard. The lanyard attached to the operator thus draws the key downward, interrupting engine operation, until the switch arm is moved back into the normally closed position, which may be accomplished without using the key and without continuously holding the switch arm in the normally closed position.

THE DRAWING

FIG. 1 is a front elevation of the control unit incorporating the features of the present invention.

FIG. 2 is a cross sectional side elevation of the unit of FIG. 1, taken along the line 2—2.

FIG. 3 is a cross sectional top view of the unit of FIGS. 1 and 2, taken along the line 3—3 in FIG. 2.

FIG. 4 is a cross sectional top view of an internal portion of the unit of FIG. 1, taken along the line 4—4.

FIG. 5 is a back view of the unit shown in FIG. 1.

FIG. 7 is a sectional view of another portion of the unit of FIG. 1, detailing the safety stop switch arrangement.

FIG. 8 is a cross sectional elevation illustrating an alternate embodiment of the "throttle only" control arrangement for the unit of FIGS. 1–7.

DETAILED DESCRIPTION

Figure 6:
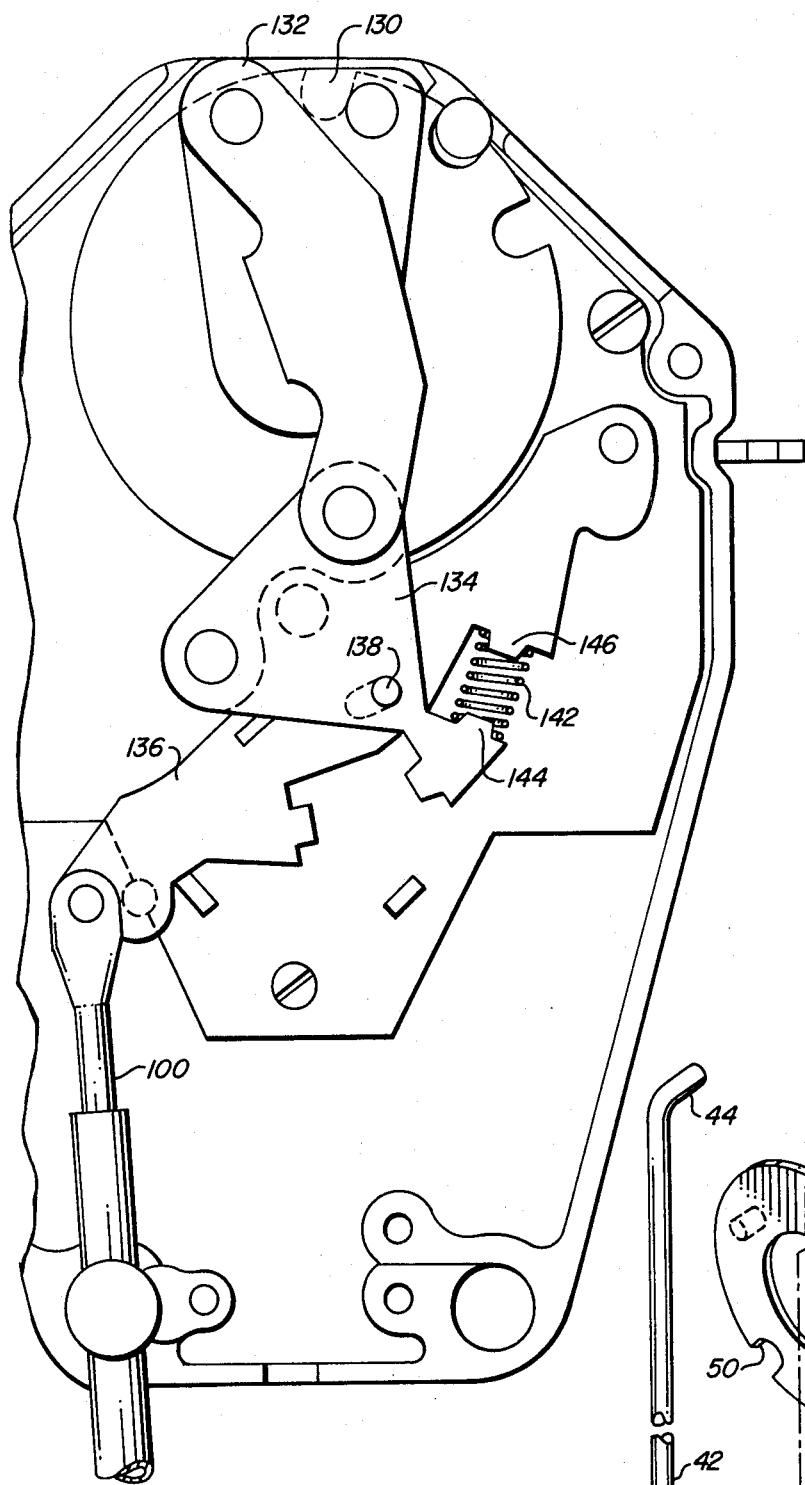
FIG. 6 is another back view of the unit of FIG. 1, with a portion of the structure shown in FIG. 5 removed, to more clearly illustrate the bias arrangement provided between the throttle arm and throttle lever.

Referring to FIGS. 1, 2 and 4, the control unit 10 includes a cover 12 having an internal cast housing 14. A control handle 16 is connected to a control shaft 18 extending through a central hole 20 in the housing 14. A bushing 22 surrounds the control shaft 18 in the central shaft hole 20. A "throttle only" or "warm up" button 24 is positioned at the bottom of the control handle 16, and is attached to a "throttle only" shaft 26. The shaft 26 is biased in an outward direction, as will be described below.

Referring to FIGS. 1, 2 and 3, the control handle 16 includes a hollow tube of generally rectangular cross-section having a crossed hand grip 28 at the top. A trigger 30 is positioned in the forward face of the grip 28, and is pivotally attached at pivot 32. In the operation of the trigger 30, it pivots at 32 to contact a stop 34, formed as an internal surface in the control handle 16.

The trigger 30 includes an aperture 36 and is forced outward by a spring 38 against a stop 40 formed within the grip 28.

Figure 9:
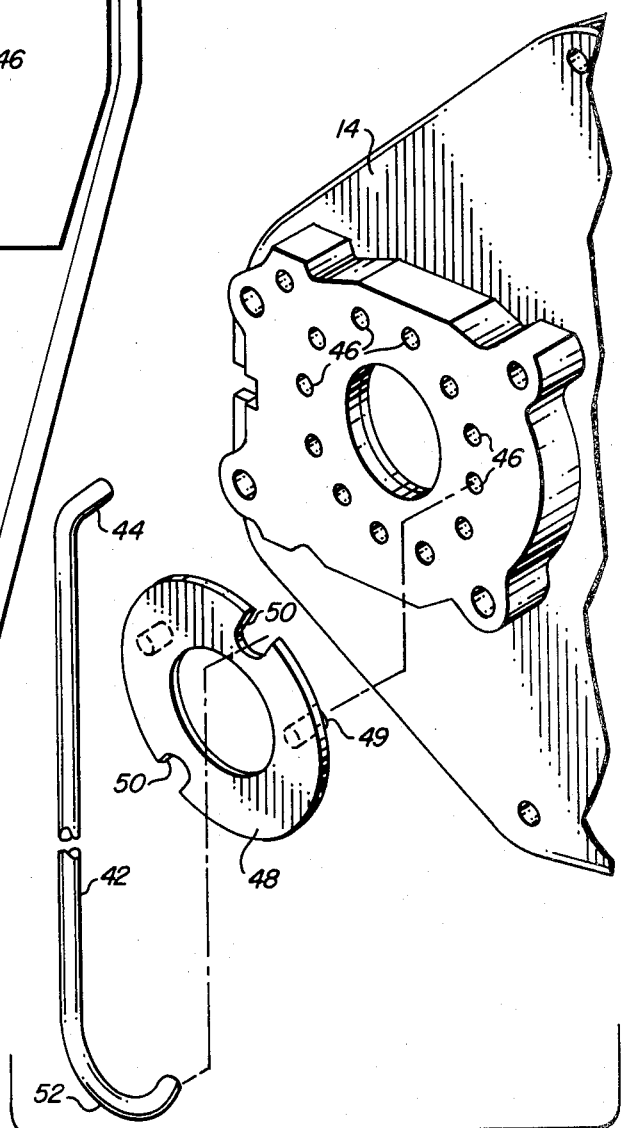
FIG. 9 illustrates details associated with the control handle lock mechanism for the unit shown in FIGS. 1–4.

As illustrated in FIGS. 2 and 3, the control unit 10 further includes a lock rod 42 having a bent upper end portion 44 retained within the aperture 36 of the trigger 30. As shown at the bottom of FIG. 2 and in detail in FIG. 9, the housing 14 includes a plurality of blind holes 46 positioned in a circular fashion about the central shaft hole 20. A lock ring 48 includes a pair of pins 49 for matching engagement with the holes 46 and slots 50 which engages the lower end of the lock rod 42. The lower end 52 of the lock rod 42 has a compound bend to engage one of the slots 50. The holes 46 in the housing 14 are spaced at equal angular distances about the central shaft hole 20 in the housing 14. In the preferred embodiment the holes 46 are about 30 degrees apart and the slots 50 in the lock ring 48 are offset about 15 degrees with respect to the radial line of the opposing slot. This permits the user to select a preferred neutral control handle position from a group of possible neutral positions. This is accomplished by alternately selecting one or the other slot and rotating the lock ring 48 to different positions with respect to the pins 49 and the holes 46.

Referring again to FIGS. 1, 2 and 3, the disengagement of the lower end 52 of the lock rod 42 can be accomplished by squeezing the trigger 30. This causes rotation of the upper end 44 which also causes the entire length of the lock rod 42 to rotate and disengage the lower end 52 from the slot 50. This causes the control handle 16 to be unlocked from the corresponding neutral position.

As shown in FIGS. 1 and 2, the control handle 16 is provided with a pair of push button switches 60 and 62 which are used to control the tilt of the marine engine in a conventional manner. These switches are surrounded by a lip 64 to prevent accidental operation. Electrical wires 66 extend through the control handle 16 and are connected with associated electrical wires 68 by a non-conductive encasement 70 which is hinged to lock corresponding male and female electrical connections associated with the wires 66 and 68 together. The control unit 10 is further provided with an ignition switch 72 which is operable with an associated key 74. The choke function is operated by axial movement of the key 74 into the switch 72. The key 74 is also encased in a plastic housing 76 having a collar 78. This facilitates movement of the key 74 toward the ignition switch 72.

In FIGS. 4 and 5, a shift gear 80 has a central opening therein surrounding the control shaft 18 to permit the shift gear 80 to rotate about that shaft. The shift gear 80 further includes a radial slot 84 and a conventional rotation limiting groove 86 on the opposing side from the slot 84, with a conventional limit pin 88 extending within the groove 86. A limited number of gear teeth 90 mesh with associated gear teeth 92 on the outer periphery of a shift pinion 94, which in turn is mounted on an associated throttle shaft 96. A shift lever 97 is fixed to the shift pinion 94 and is connected at one end to the shift cable 98. The entire assembly is supported in the housing 12 by a bearing plate 99. As will be described in greater detail below, the shift and throttle linkages are connected with the shaft 96 and associated hardware to control the shift and throttle cable linkages 98 and 100, respectively.

The warm up shaft 26 includes a tongue 102 at the inner end with the tongue having a ramp 104 along its outer periphery. A ball 106 is positioned within the depression formed by the ramp 104 and bears against a latch pin 108 extending through the slot 84 in the shift gear 80. The pin 108 is under compression by a ball 110 loaded with a spring 112. The tongue 102 is surrounded by a cylindrical member 114 which permits the tongue to slide axially through the housing 14. The cylindrical member 114 has a hole 115 adapted to receive the ball 106.

To warm up the marine engine, the throttle only button 24 (with the control handle 16 in the neutral position) is first depressed to move the shaft 26 axially toward the back of the housing 14. This forces the ball 106 upward into a hole in the control shaft which forces the latch pin 108 out of engagement with the hole in the control shaft. With the latch pin 108 disengaged from the control shaft 18, the control shaft 18 is free to rotate without engagement of the shift mechanism. Then the trigger 30 must be depressed to permit movement of the handle. Moving the handle will then only operate the throttle.

Upon warm up of the engine, combined throttle and shift is again obtained by moving the control handle back to the neutral position. This causes the lock rod 42 to engage the lock ring 48, and further causes the ball 106 to drop into the forward edge of the ramp 104. Then the load of the spring 112 against the ball 110 and the latch pin 108 causes further movement of the ball 106 downward across the surface of the ramp 104 to cam the throttle only shaft 26 outward thereby returning the warm up button 24 to the original position. As the pin 108 returns to its original position it is latched with the control shaft 18, thereafter causing the shift gear 80 to rotate with the control shaft 18 until such time as the throttle only button 24 is again depressed. The warm up construction described above permits manufacture of component parts at a low cost. The known prior throttle only components are very time consuming to manufacture at a reasonable cost. The warm up construction described above only requires the drilling of one hole in the control shaft 18 (the hole which engages the pin 108) and the forming of the slot 84 during the casting of the shift gear 80. Thus, the use of the radial motion shown in FIG. 4 provides a highly reliable, relatively inexpensive method for providing the throttle only feature of the control unit 10.

An alternate arrangement for providing the throttle only control is shown in FIG. 8 with like reference numerals employed with respect to the same elements which are shown in FIGS. 1 through 7.

In FIG. 8 the throttle only control comprises a knob 120 extending through the control shaft 18 and having a key 122 extending axially therefrom toward the rear of the control unit. The key 122 includes a ramp 124 similar to the ramp 104 of FIG. 4 but being ramped in the opposing direction. A detent groove 126 is positioned at the inner end of the key 122. A ball 106 is positioned in a corresponding hole in the control shaft 18 and engages the latch pin 108 which in turn is pushed inward by another ball 110 and a spring 128. In the arrangement of FIG. 8, the throttle only mechanism is activated by pulling the knob 120 outwardly causing the ball 106 to be cammed up the ramp 124 and coming to rest in the detent 126. This movement forces the latch pin 108 upward and out of contact with the control shaft 18. As a result the shift gear 80 (with which the latch pin 108 is engaged by a slot 84 like the slot of FIG. 4), is disengaged from the control shaft 18. This disengages the shift mechanism thereby permitting the control handle to provide throttle only for engine warm up.

Upon engine warm up the shift mechanism is engaged by moving the control handle 16 to the neutral position and pushing the throttle only knob 120 inward. This causes the ball 106 to initially be driven upward against the latch pin 108, ball 110 and spring 128. After the ball passes out of the detent 126 it is cammed downward over the ramp 124 coming to rest in a position which permits the pin 108 to again engage the control shaft 18 to thereafter rotate the shift gear 80 with the control shaft. The throttle only feature shown in FIG. 8 requires a manual return of the throttle only knob 120 while the throttle only feature shown in FIG. 4 automatically returns the control to a combined throttle and shift operation.

Referring to FIGS. 5 and 6, the throttle mechanism includes a detent plate 129 and a crank arm 130 which are connected for rotation with the control shaft 18, and a link 132 connecting the crank arm 130 and a throttle lever 134. The throttle lever 134 is connected to a throttle arm 136 which in turn is attached to the throttle control cable 100. Rotation between the throttle lever 134 and the throttle arm 136 is limited by a pin 138 fixed to the throttle lever 134 and extending into a slot in the throttle arm 136. The purpose of this limited rotation between the throttle lever 134 and the throttle arm 136 is to absorb the motion of the crank arm 130 as it moves 30 degrees either way from dead center during operation of the shift mechanism.

To prevent the throttle control cable 100 from being moved during the 30 degrees of rotation of the handle 16 during operation of the shift mechanism, a spring 142 is inserted between the throttle lever 134 and the throttle arm 136 to keep the throttle arm tight against the idle stop while the throttle lever is moving. The spring 142 is mounted on corresponding tabs 144 and 146 on the throttle lever 134 and throttle arm 136. The throttle arm 136 is double ended so that the throttle control cable 100 can be attached to either end and be pulled or pushed to increase engine speed in the desired manner. This makes the control unit 10 useable for a variety of different engine throttle linkages. To permit a right hand or left hand control for installation on either side of the boat, the crank arm 130, throttle lever 134 and throttle arm 136 are all symmetrical so that the connecting link and spring can be assembled on either side of the throttle lever and arm.

Referring to FIGS. 1, 4, 5 and 7, a safety stop switch assembly is mounted on the rearward face of the housing 14. The safety stop switch comprises a conventional single pole single throw toggle switch having a switch arm 154 extending outward from the periphery of the cover 12. The throw of the switch is maintained in a vertical direction. The switch 152 is connected to the electrical system of the engine to turn the engine off when the switch arm 154 is in the down position. (Note electrical connection shown in FIG. 5). The switch arm 154 is partially surrounded by a switch hood 156, the edge of the hood having a lip which is positioned close to the outward end of the switch arm 154 when the switch is in the "up" position (Note FIG. 7). Slanted wing portions extend between the periphery of the cover 12 and the lip.

The safety stop switch 152 is also provided wih a key 158 which comprises a closed loop which can be positioned under the hood 156 to encircle the switch arm 154 (Note FIGS. 1, 4 and 7). The thickness of the key 158 is dimensioned so that it cannot pass between the switch arm 154 and the hood 156 while the switch arm 154 is in the "up" position. The key 158 further includes a hole at the bottom for receiving a lanyard 160 which can be attached to the operator of the boat.

In use, if the operator of the boat accidently falls overboard, the lanyard 160 pulls the key 158, causing the switch arm 152 to be pulled to the down (and off) position, thereby interrupting operation of the engine. The engine may be restarted and operated by reaching under the hood 156 and forcing the switch arm 154 into the up or "run" position. This permits the engine to be started and then run without continuous manual operation of the safety stop switch 152. This is useful in emergencies to permit a passenger to operate the boat without using the key 158.

I claim:

1. A safety stop switch assembly for an engine control unit, comprising:
   (a) a control unit housing;
   (b) a normally closed switch for electrical connection to an engine to interrupt engine operation when switched to an open position, said normally closed switch being mounted on said housing and including a switch arm extending away from said housing to permit operation of said switch between closed and open positions;
   (c) a key encircling said switch arm;
   (d) means restricting removal of said key from said switch arm while in said closed position and allowing removal of said key from said switch arm while in said opening position; and
   (e) means coupled with said key to exert a force through said key against said switch arm to thereby operate said switch to the open position and remove said key from said switch arm.

2. The safety stop switch assembly defined in claim 1 wherein said restricting means comprises a hood extending away from said housing and covering said switch arm.

3. The safety stop switch assembly defined in claim 2 wherein said hood comprises a lip at the edge thereof which is spaced from said switch arm while in the closed position a dimension less than the thickness of said key, thereby preventing removal of said key from about said switch arm until said arm is switched to the open position.

4. The safety stop switch assembly defined in claim 3 wherein said hood includes slanted wing portions extending from said housing to said lip.

5. The safety stop switch assembly defined in claim 3 wherein said force exerting means comprises a lanyard connected to said key.

6. A safety stop switch assembly for remote control units of the type employed with a marine engine, said safety stop switch assembly responding to movement of the operator of the engine a certain distance from the control unit to interrupt operation of said engine, said assembly comprising:

(a) a control unit housing;
(b) a single pole, single throw switch having a switch arm for operating said switch between closed and open positions responsive to movement of said switch arm about a pivot axis in the plane of the outer periphery of said control housing;
(c) a key encircling said switch arm;
(d) a hood extending from the periphery of said housing and covering said switch arm when in the closed position, said hood having a peripheral lip spaced from said switch arm a dimension less than the thickness of said key; and
(e) a lanyard for coupling said key to said operator.

7. A safety stop switch assembly as recited in claim 6 wherein said hood further comprises slanted wing portions extending from said housing to said lip.

* * * * *